United States Patent
Shirai

(10) Patent No.: US 6,394,470 B1
(45) Date of Patent: May 28, 2002

(54) STOCK CART

(75) Inventor: Takanao Shirai, Tokyo (JP)

(73) Assignee: Kawajun Co. Ltd., Tokyo (JP)

( * ) Notice: Subject to any disclaimer, the term of this patent is extended or adjusted under 35 U.S.C. 154(b) by 0 days.

(21) Appl. No.: 09/604,909

(22) Filed: Jun. 28, 2000

(51) Int. Cl.⁷ ............................................. B62D 39/00
(52) U.S. Cl. .............................. 280/33.996; 280/79.11; 280/47.34
(58) Field of Search ........................... 280/43.1, 33.991, 280/33.996, 33.997, 33.998, 43, 47.18, 47.23, 47.371, 43.12, 79.11, 79.3, 47.16, 41.17, 639, 641

(56) References Cited

U.S. PATENT DOCUMENTS

| | | | | |
|---|---|---|---|---|
| 3,551,001 A | * | 12/1970 | Wilson | 280/47.34 |
| 3,689,098 A | * | 9/1972 | Rubin | 280/33.99 |
| 3,698,733 A | * | 10/1972 | Isaacs | 280/33.99 |
| 3,782,746 A | * | 1/1974 | Isaacs | 280/33.99 |
| 3,840,243 A | * | 10/1974 | Rheinhart et al. | 280/36 |
| 3,861,702 A | * | 1/1975 | Wilson | 280/36 |
| 3,977,689 A | * | 8/1976 | Rosa | 280/33.99 |
| 4,863,179 A | * | 9/1989 | Isaacs | 280/33.996 |
| 5,556,118 A | * | 9/1996 | Kern et al. | 280/47.16 |

\* cited by examiner

*Primary Examiner*—Lanna Mai
*Assistant Examiner*—Kelly E Campbell
(74) *Attorney, Agent, or Firm*—Oblon, Spivak, McClelland, Maier & Neustadt, P.C.

(57) ABSTRACT

In a six-wheel stock cart 10 including a dolly frame 1 having a nesting construction, free casters 2 attached to bottom surfaces of the dolly frame 1 that are near four corners of the dolly frame, a pair of stationary casters 3 attached to a bottom surface of a substantially intermediate portion of the dolly frame, and a dolly plate 4 pivotably attached to a site that is near a rearward end portion of the dolly frame, the stock cart is nested based on operation of the four free casters 2 after a plane defined by lower ends of the stationary casters 3 is positioned above a plane defined by lower ends of the four free casters by pivoting the dolly plate 4 upward. Therefore, the stock cart can be freely nested in a direction of a shorter dimension of the stock cart.

2 Claims, 17 Drawing Sheets

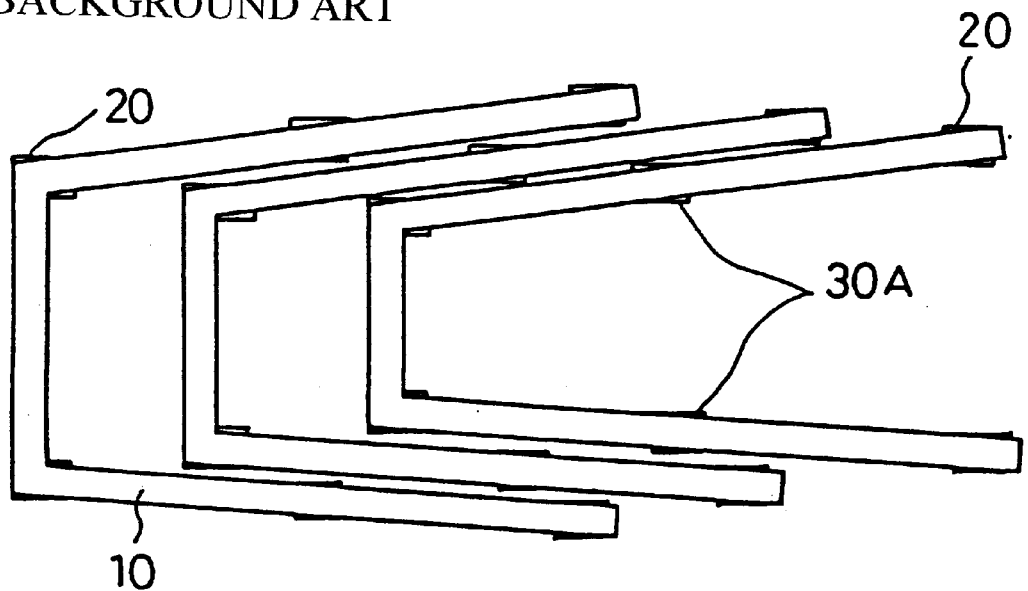
FIGURE 21A
BACKGROUND ART
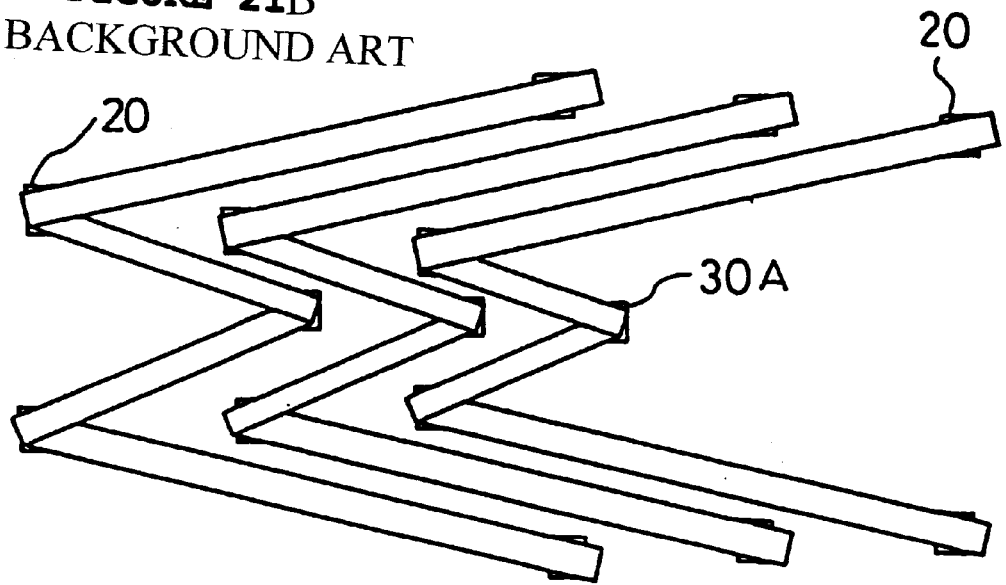
FIGURE 21B
BACKGROUND ART

STOCK CART

TECHNICAL FIELD

The present invention relates to a high-nesting efficiency stock cart for use in transporting commodity products contained in cardboard boxes or the like, or storing or retaining commodity products, etc.

BACKGROUND ART

Conventional stock carts, as shown in FIGS. 21(a) and 21(b), are formed by a dolly in which free casters 20 are connected to bottom surfaces of four corner portions of a dolly frame having a generally squared letter-U frame shape or a generally letter-M frame shape in a plan view, and stationary caster 30A are connected to bottom surfaces of opposite side portions of a substantially middle portion of the dolly frame, and by a pair of movable side face frames detachably connected to forward and rearward portions of the dolly (not shown in the drawings). To put such dollies into a nested state for their storage and retention, the nesting thereof is accomplished in a direction of the length of the dollies due to the unidirectionality of the stationary casters.

However, this fashion of nesting needs a great space in the lengthwise direction, and therefore has a problem in efficient use of space.

Hence, an object of the invention is to provide a stock cart capable of being nested in a direction of a shorter dimension of the stock cart.

DISCLOSURE OF THE INVENTION

Accordingly, the invention (1) provides a stock cart including a dolly frame having a nesting construction, free casters attached to bottom surfaces of the dolly frame that are near four corners of the dolly frame, a stationary caster attached to a bottom surface of a substantially intermediate portion of the dolly frame, and a dolly plate pivotably attached to a site that is near a rearward end portion of the dolly frame, wherein the stock cart is nested based on operation of the four free casters after a plane defined by a lower end of the stationary caster is positioned above a plane defined by lower ends of the four free casters by pivoting the dolly plate upward.

Furthermore, the invention (2) provides a stock cart comprising: a dolly frame formed into a generally letter-Z configuration or a generally reversed letter-Z configuration by a support bar that is disposed at a rearward end portion and that has at two ends thereof tubular cylinder portions, a member that is disposed at a forward end portion and is disposed at a predetermined interval apart from the support bar and parallel to the support bar, and a connector member that integrally interconnects an end portion of the member of the forward end portion and an end portion of the support bar of the rearward end portion that are positioned on a diagonal line; forward end portion-side free casters attached to a bottom surface of the member of the forward end portion of the dolly frame; a free caster portion including rearward end portion-side free casters, a free caster support plate that secures and interconnects support brackets of the rearward end portion-side free casters, and a pair of piston portions that are secured above the free casters and that are inserted in the tubular cylinder portions so that the piston portions are slidable in upward and downward directions; a stationary caster attached to a bottom surface of a middle portion of the connector member; a forward end-side side face frame secured at two ends thereof to an end portion of the member of the forward end portion; a rearward end-side side face frame two end portions of which are secured to or detachably disposed on outer sides of the cylinder portions; and a dolly plate having a rectangular dolly plate body, and a pivotal contact portion that is pivotably supported by the support bar of the rearward end portion, the stock cart being characterized in that the pivotal contact portion of the dolly plate has a support bar bearing groove, and a plate stopper end portion having a quadrangular section, and a configuration of the dolly plate stopper end portion is formed so that when the dolly plate is placed on the dolly frame, a distance between the support bar and a rearward end surface of the dolly plate is greater than a distance between the support bar and the free caster support plate.

Furthermore, the invention (3) provides a stock cart comprising: a dolly frame formed into a generally letter-Z configuration or a generally reversed letter-Z configuration by a support bar that is disposed at a rearward end portion and that has at two ends thereof tubular cylinder portions, a member that is disposed at a forward end portion and is disposed at a predetermined interval apart from the support bar and parallel to the support bar, and a connector member that integrally interconnects an end portion of the member of the forward end portion and an end portion of the support bar of the rearward end portion that are positioned on a diagonal line; forward end portion-side free casters attached to a bottom surface of the member of the forward end portion of the dolly frame; a free caster portion including rearward end portion-side free casters, a free caster support member that secures and interconnects support brackets of the rearward end portion-side free casters, and a pair of piston portions that are secured above the free casters and that are inserted in the tubular cylinder portions so that the piston portions are slidable in upward and downward directions; a stationary caster attached to a bottom surface of a middle portion of the connector member; a forward end-side side face frame secured at two ends thereof to an end portion of the member of the forward end portion; a rearward end-side side face frame two end portions of which are secured to or detachably disposed on outer sides of the cylinder portions; and a dolly plate having a rectangular dolly plate body, and a pivotal contact portion that is pivotably supported by the support bar of the rearward end portion, the stock cart being characterized in that a support bar bearing groove is formed on a lower surface side of the pivotal contact portion, and a stopper piece is formed on an upper surface of the pivotal contact portion, and the dolly plate is connected to the rearward end-side side face frame so that a plane defined by a lower end of the stationary caster is above a plane defined by lower ends of the four free casters by bringing the stopper piece and the free caster support member into contact.

Furthermore, the invention (4) provides a stock cart wherein the dolly frame is formed into a generally letter-H configuration by a support bar that is disposed at a rearward end portion and that has at two ends thereof tubular cylinder portions, a member that is disposed at a forward end portion and is disposed at a predetermined interval apart from the support bar and parallel to the support bar, and a connector member that integrally interconnects a middle portion of the member of the forward end portion and a middle portion of the support bar of the rearward end portion that are positioned on a center line of the member of the forward end portion and the support bar of the rearward end portion.

Furthermore, the invention (5) provides a stock cart comprising: a dolly frame formed into a generally letter-H configuration by a member that is disposed at a rearward end portion and that has in a middle portion thereof a hole extending upward and rearward through the member, a member that is disposed at a forward end portion and is disposed at a predetermined interval apart from the member of the rearward end portion and parallel to the member of the rearward end portion, and a connector member that integrally interconnects a middle portion of the member of the forward end portion and a middle portion of the member of the rearward end portion that are positioned on a center line of the member of the forward end portion and the member of the rearward end portion; forward end portion-side free casters attached to a bottom surface of the member of the forward end portion of the dolly frame; a free caster portion including rearward end portion-side free casters, a free caster support member that secures and interconnects support brackets of the rearward end portion-side free casters, a support column portion standing from an upper surface of the free caster support member, and a support bar extending perpendicularly across a distal end of the support column portion and having a pair of right and left support shafts, the support column portion loosely fitted in a hole of the member of the rearward end portion of the dolly frame so that the support column portion and the member of the rearward end portion are movable relative to each other in upward and downward directions; a stationary caster attached to a bottom surface of a middle portion of the connector member; a forward end-side side face frame secured to the member of the forward end portion; a rearward end-side side face frame secured to a side face frame holder portion that has a shaft-like protrusion and that is coupled to the member of the rearward end portion; and a dolly plate having a rectangular dolly plate body that is connected at a rearward end portion-side end portion thereof with a pair of pivotal connector plates that are pivotably supported by a support shaft of the support bar and the shaft-like protrusions attached to the side face frame holder portion, the stock cart being characterized in that the dolly plate is connected to the rearward end-side side face frame so that by pivoting the dolly plate with a support portion of the shaft-like protrusion serving as a fulcrum, the support column portion is spaced apart from the member of the rearward end portion of the dolly frame, and a plane defined by a lower end of the stationary caster is positioned above a plane defined by lower ends of the four free casters.

Furthermore, the invention (6) provides a stock cart, wherein the dolly frame is formed into a generally letter-Z configuration or a generally reversed letter-Z configuration by a member that is disposed at a rearward end portion and that has in a middle portion thereof a hole extending upward and rearward through the member, a member that is disposed at a forward end portion and is disposed at a predetermined interval apart from the member of the rearward end portion and parallel to the member of the rearward end portion, and a connector member that integrally interconnects an end portion of the member of the forward end portion and an end portion of the member of the rearward end portion that are positioned on a diagonal line.

Furthermore, the invention (7) provides a stock cart wherein in a moving state, the stock cart becomes a six-wheel cart, and can be moved in a fashion of a seesaw with the middle-positioned stationary caster being a center, and can be freely turned in direction, and when the stock cart is to be nested, the dolly plate is stood up so that a ground contact plane defined by a lower end of the stationary caster is positioned above a plane defined by lower ends of the free casters and, thus, the stationary caster does not contact a ground surface but becomes idle, and the stock cart is movable only on the four free casters.

DETAILED DESCRIPTION

Figure 1:
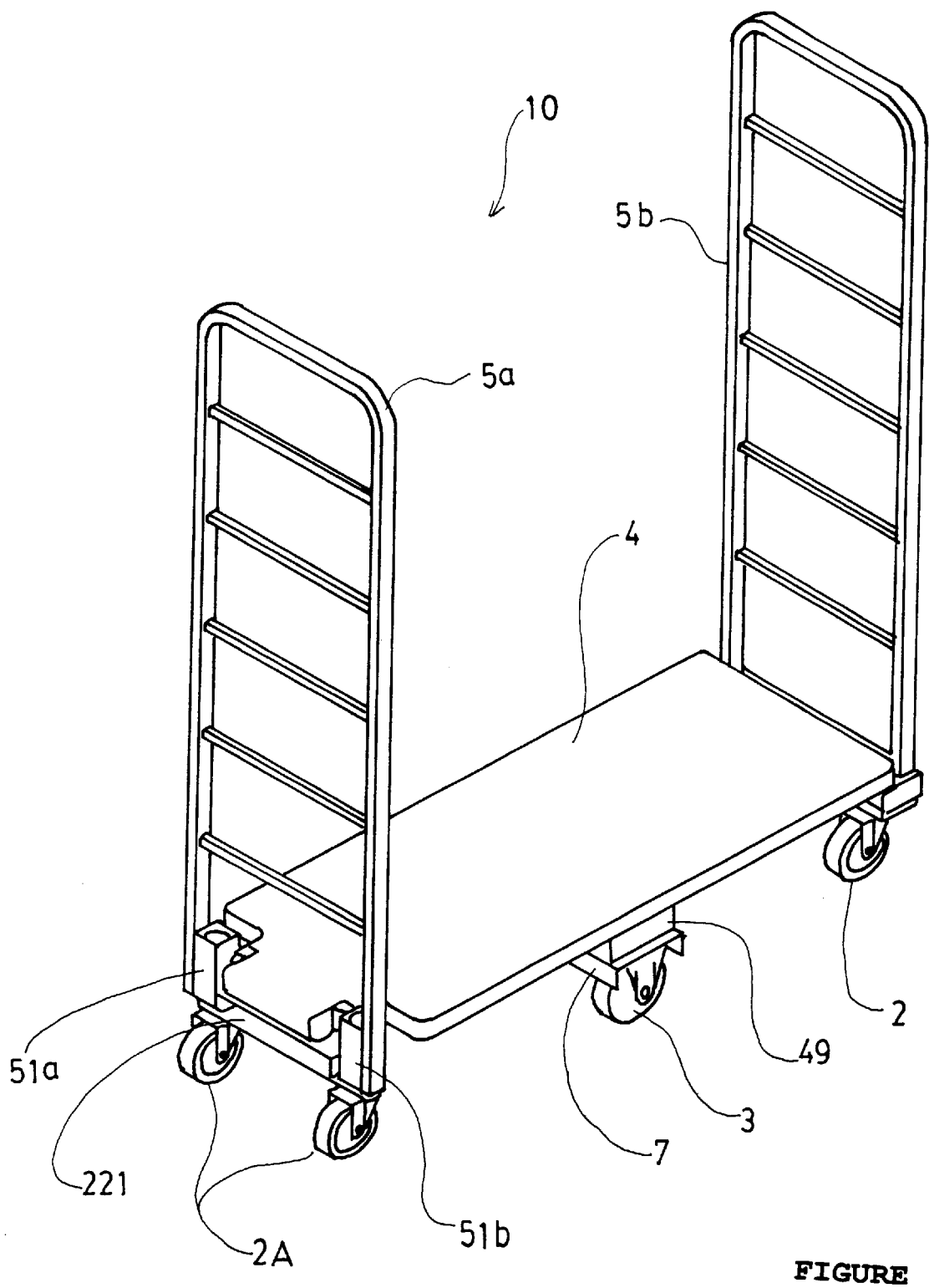
FIG. 1 is a perspective view of a stock cart of the invention, illustrating an overall construction thereof.
Figure 2:
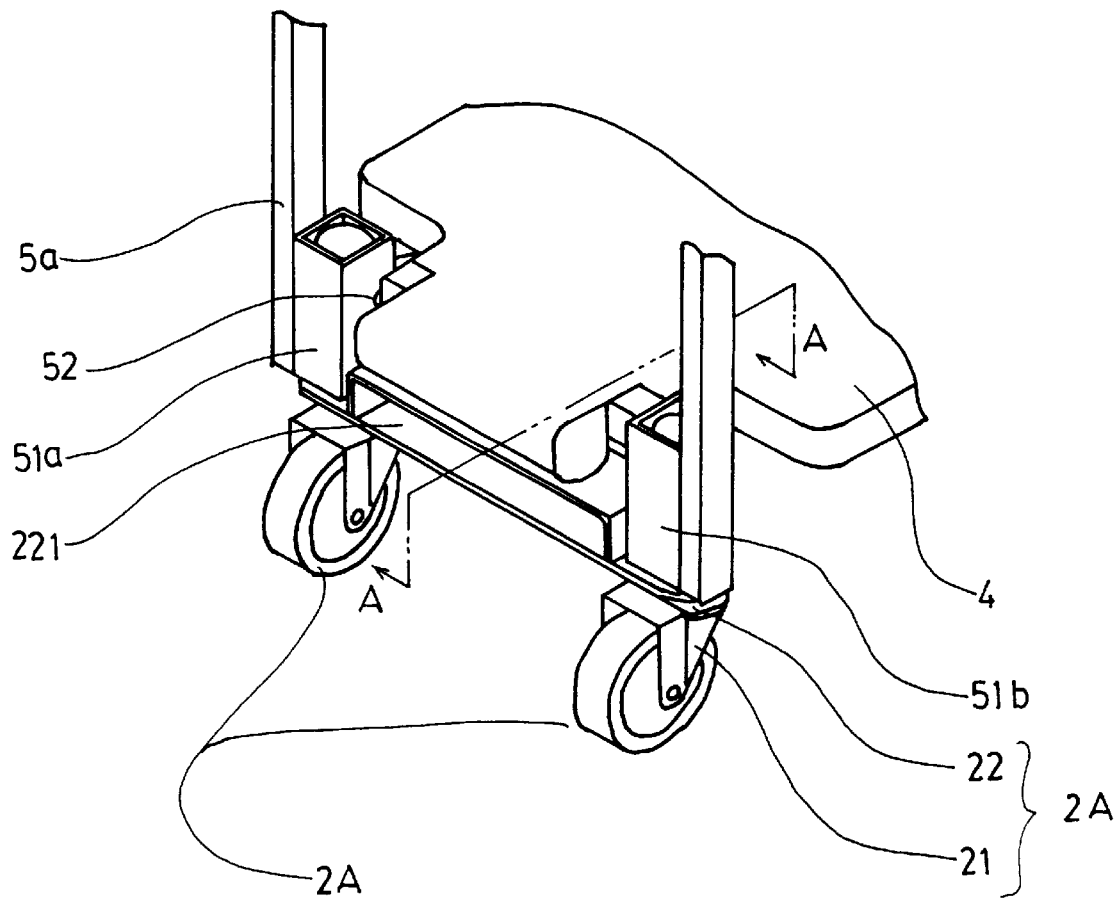
FIG. 2 is an enlarged view of a rearward end portion shown in FIG. 1.
Figure 3:
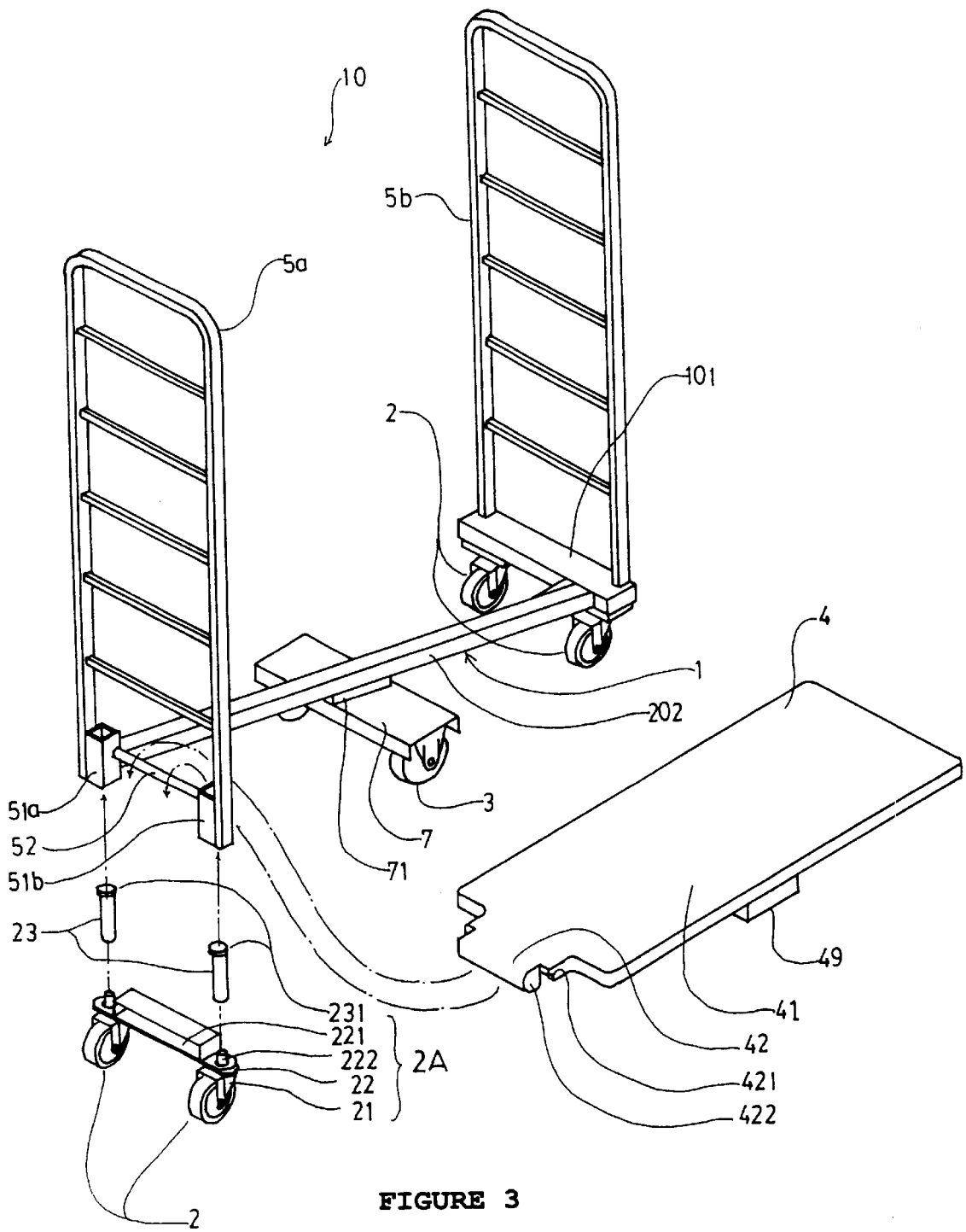
FIG. 3 is an exploded view of main portions of the stock cart of the invention.
Figure 4:
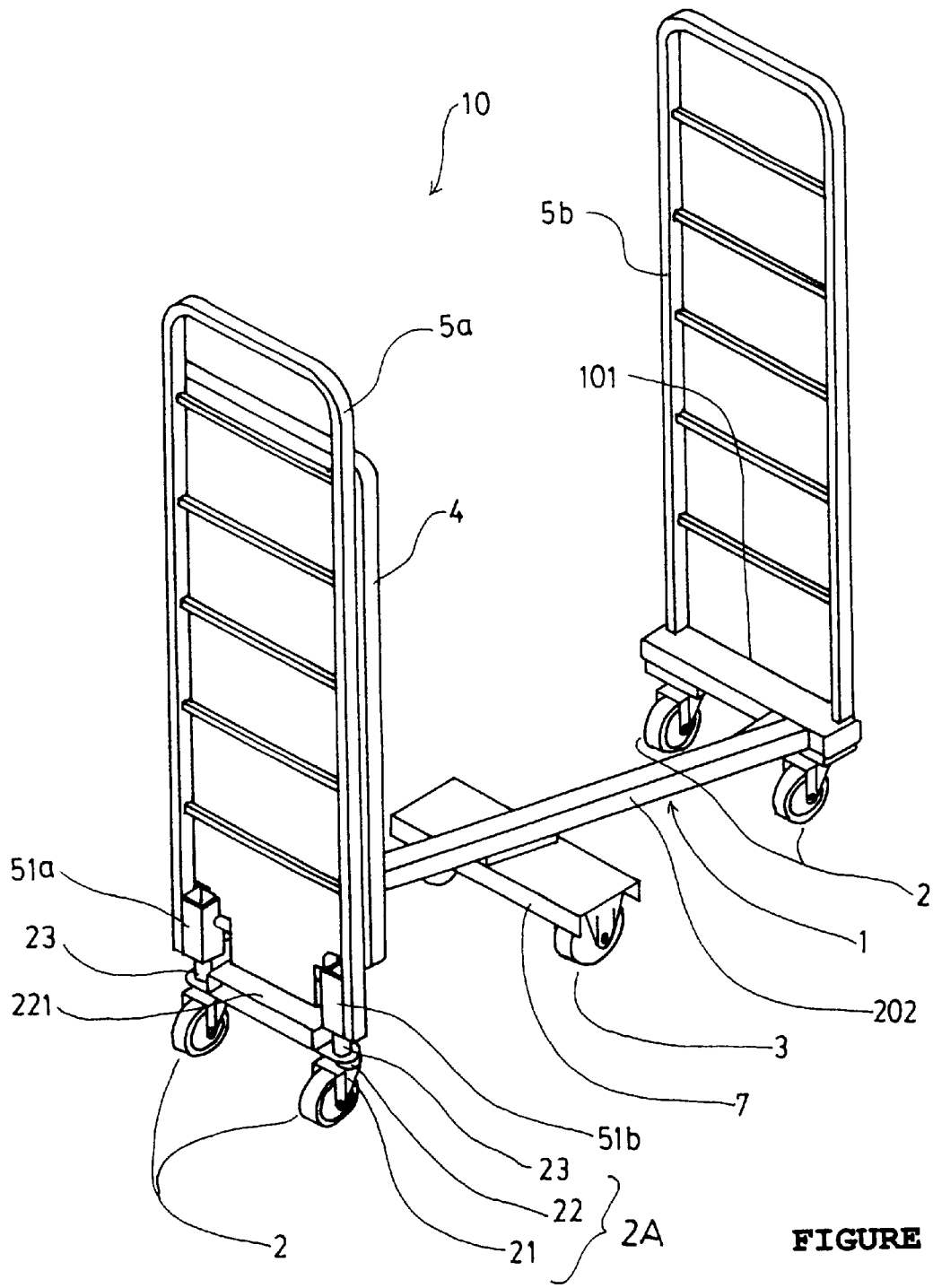
FIG. 4 is a perspective view illustrating a state where a dolly plate is stood up.
Figure 5:
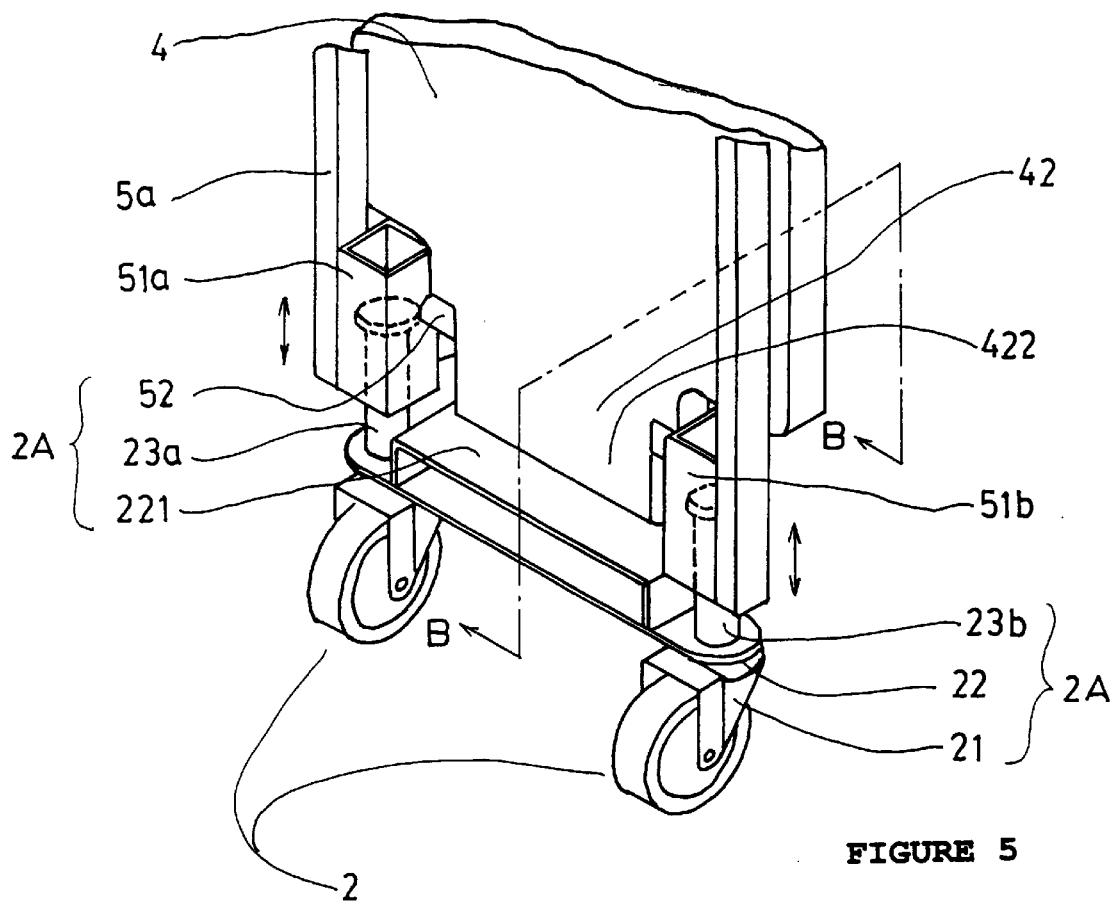
FIG. 5 is an enlarged view of a rearward end portion shown in FIG. 4.
Figure 6:
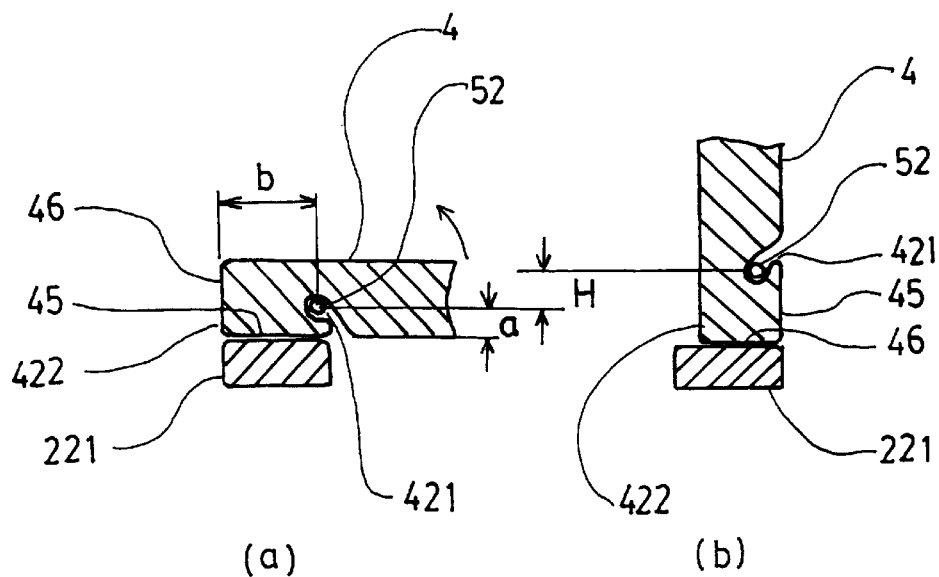
FIG. 6 are views illustrating states of contact between a pivotal contact portion of the dolly plate and a free caster support plate.
Figure 7:
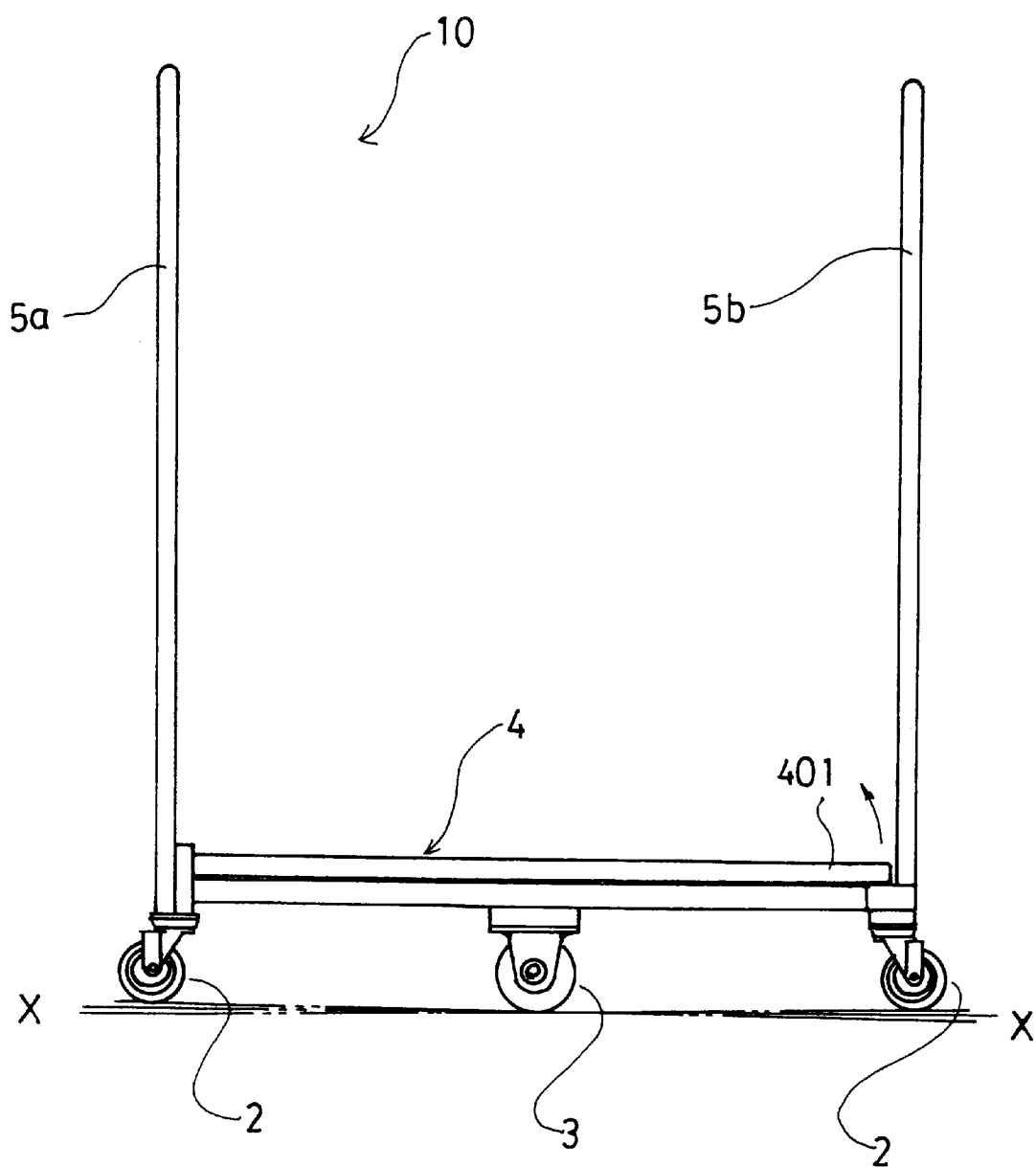
FIG. 7 is a side view of the stock cart where the dolly plate is laid down.
Figure 8:
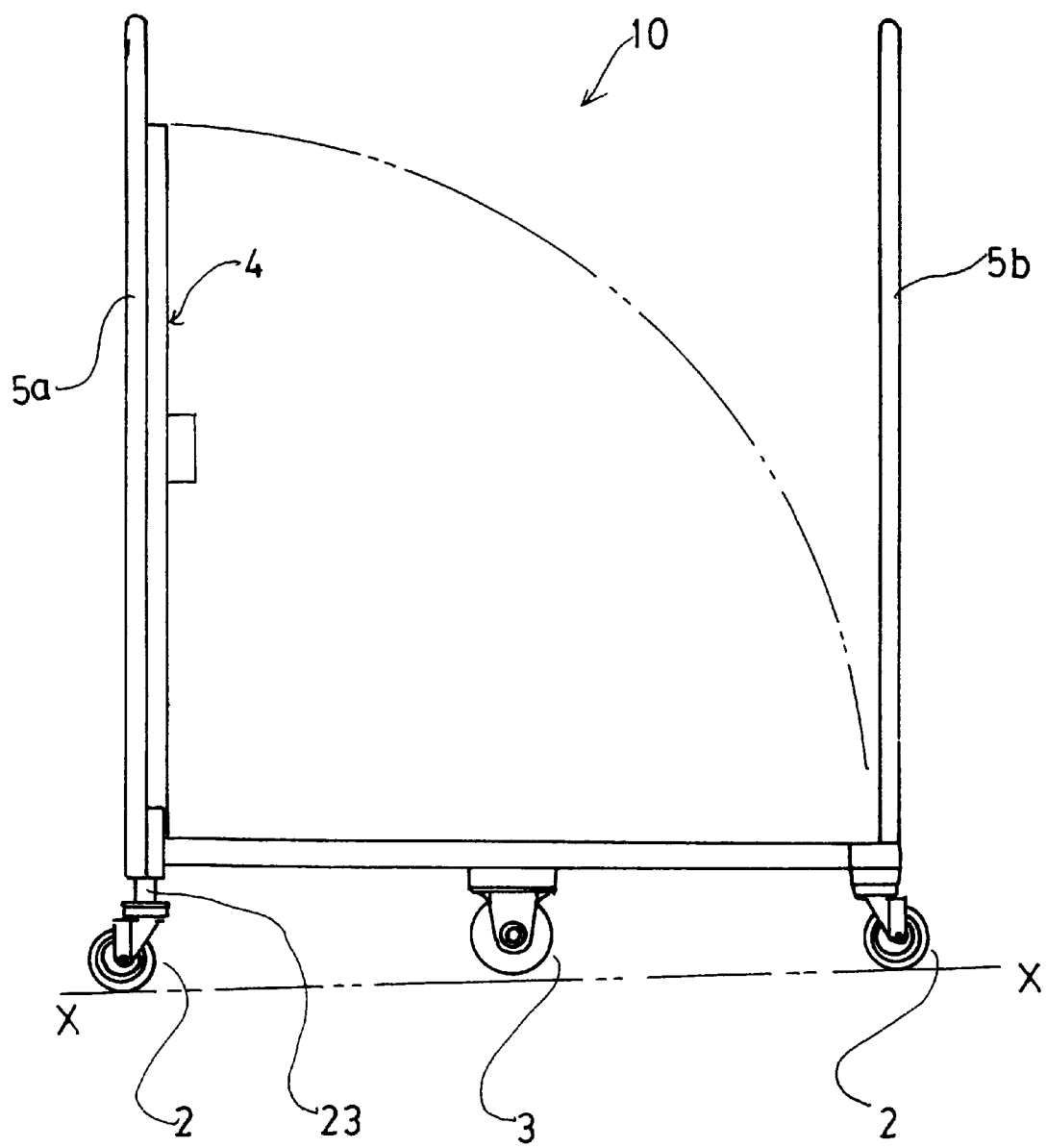
FIG. 8 is a side view of the stock cart where the dolly plate is stood up.

An embodiment of the invention will be described hereinafter with reference to FIG. 1 to FIG. 9. FIG. 1 is a perspective view of a stock cart of the invention; FIG. 2 is an enlarged view of a rearward end portion shown in FIG. 1; FIG. 3 is an exploded view of main portions; FIG. 4 is a perspective view illustrating a state where a dolly plate shown in FIG. 1 is stood up; FIG. 5 is an enlarged view of a rearward end portion shown in FIG. 4; FIG. 6(*a*) is a view taken along line A—A in FIG. 2; FIG. 6(*b*) is a view taken along line B—B in FIG. 5; FIG. 7 is a side view where the dolly plate is laid down; and FIG. 8 is a side view where the dolly plate is stood up. In FIG. 1 to FIG. 8, a stock cart 10 has a caster-equipped dolly frame 1, a pair of side face frames 5, 5, and a dolly plate 4.

As shown in FIG. 3, the dolly frame 1 is formed into a letter-Z configuration by a support bar 52 that has, at its two ends, tubular rectangular-prismatic cylinder portions 51a, 51b, and a forward end member 101 that is disposed at a predetermined interval apart from the support bar 52 and parallel thereto, and a connector member 202 that integrally interconnects diagonally-positioned end portions of the forward end member 101 and the rearward end support bar 52. Free casters 2, 2 are attached to a bottom surface of the member 101 disposed at the forward end portion of the dolly frame 1. Piston portions 23, 23 of a free caster portion 2A are inserted into bottom surfaces of the cylinder portions 51a, 5b in such a manner that the piston portions 23, 23 are slidable in upward and downward directions. Stationary casters 3, 3 are attached to a bottom surface of a middle portion of the connector member 202 via a stationary caster support plate 7 and a stationary caster height adjuster plate 71. The side face frame 5b is formed by fixing two ends thereof to end portions of the member 101, and the side face frame 5a is formed by fixing two end portions thereof to outer sides of the cylinder portions 51a, 51b.

The dolly plate 4 is formed by a pivotal contact portion 42 pivotably supported to the support bar 52, a rectangular dolly plate body 41, and a dolly plate height adjuster plate 49. The dolly plate height adjuster plate 49 is a pair of box-like members formed on both sides of a middle portion of a reverse surface of the dolly plate body 41. The pivotal contact portion 42 is formed by a support bar bearing groove 421, and a dolly plate stopper end portion 422 having a quadrangular or rectangular sectional shape. The pivotal contact portion 42 has a shape wherein end portions are cut out to avoid impingement with the cylinder portions 51a, 51b when the dolly plate 4 is pivoted.

The free caster portion 2A, positioned on the bottom surface of a rearward end portion of the dolly frame 1, is formed by the free casters 2, 2, a free caster support plate 221 that secures and interconnects support blackest 22, 22 of the free casters 2, 2 and that has a consistent height in a middle portion thereof, and the pair of piston portions 23, 23 having, on their upper surfaces, sliding portions 231. The connection between the free casters 2, 2 and the piston portions 23, 23 is accomplished by screw engagement between male threads of upper portions of the free casters 2, 2 and female threads formed inside the piston portions 23. The piston portions 23, 23 of the free caster portion 2A formed as described above are inserted into the pair of cylinder portions 51a, 51b from below to form a stock cart.

When the stock cart 10 of the embodiment constructed as described above is to be used, the dolly plate 4 pivotable about the support bar 52 positioned at the rearward end portion is laid down onto the frame 1. The dolly plate height adjuster plate 49 contacts the stationary caster support plate 7, so that the dolly plate 4 assumes a stable state where the dolly plate 4 is parallel to a ground surface. Furthermore, with regard to the rearward end portion of the dolly plate 4, a rearward reverse surface 45 of the dolly plate contacts an upper surface of the free caster support plate 221 as shown in FIG. 6(a).

The thus-formed stock cart 10 is a six-wheel cart as shown in FIG. 1 and FIG. 7. The stock cart 10 can be moved in the fashion of a seesaw with the middle-positioned stationary casters 3, 3 being a center. Furthermore, direction turning movements and the like of the stock cart 10 can be freely accomplished. The dolly plate 4 may be simply placed on the dolly frame 1, or may be fastened thereto by a fastening device. Ground contact planes X—X defined by ground-surface contact points of the free casters 2, 2, 2, 2 and the stationary casters 3, 3 may be one and the same plane, or the ground contact plane defined by the points of contact of the stationary casters 3, 3 with a ground surface may be below the ground contact plane defined by the points of contact of the free casters 2, 2, 2, 2 with a ground surface.

Next, when the stock cart 10 is to be nested, a forward end-side end portion 401 of the dolly plate 4 is lifted upward, and the dolly plate 4 is stood up by pivoting the dolly plate 4 about the support bar 52 positioned at the rearward end portion. The dolly plate 4 is then secured to the side face frame 5a formed rearward by, for example, a chain or a rope, although not shown in the drawings.

As shown in FIG. 5 and FIGS. 6(a) and 6(b), because a distance b between a center of the support bar 52 and an end surface of the dolly plate is greater than a distance a between the center of the support bar 52 and the reverse surface of the dolly plate, and because the piston portions 23a, 23b of the free casters are slidable in the upward and downward directions within the cylinder portions 51a, 51b, the standing of the dolly plate 4 replaces the contact between the upper surface of the free caster support plate 221 and the rearward reverse surface 45 of the dolly plate with the contact between the upper surface of the free caster support plate 221 and the rearward end surface 46 of the dolly plate, so that the support bar 52 is lifted upward. That is, the stationary casters 3, 3, the side face frame 5a and the integrally connected members of the dolly frame 1 are lifted by amounts corresponding to a length H from the state assumed during the use, so that a ground contact plane defined by lower ends of the stationary casters 3, 3 is positioned above the plane defined by the lower ends of the free casters 2, 2, 2, 2, as shown in FIG. 8. In this case, a frame body formed by the side face frames 5a, 5b and the dolly frame assumes a state where the frame body is slightly inclined rightward (toward the forward end portion).

In the nestable-state cart, the stationary casters 3, 3 do not contact the ground surface, so that the wheels are idle, and the cart is moved only on the four free casters. Therefore, the cart can be moved in free directions, and can be nested in a direction of a shorter dimension of the cart. Thus, it becomes possible to perform a nesting operation in a limited space.

Furthermore, in the invention, the dolly frame is not restricted by the above-described letter-Z configuration as long as the dolly frame has a nesting construction. For example, a letter-H configuration, a reversed letter-Z configuration, and the like may be adopted.

Figure 9:
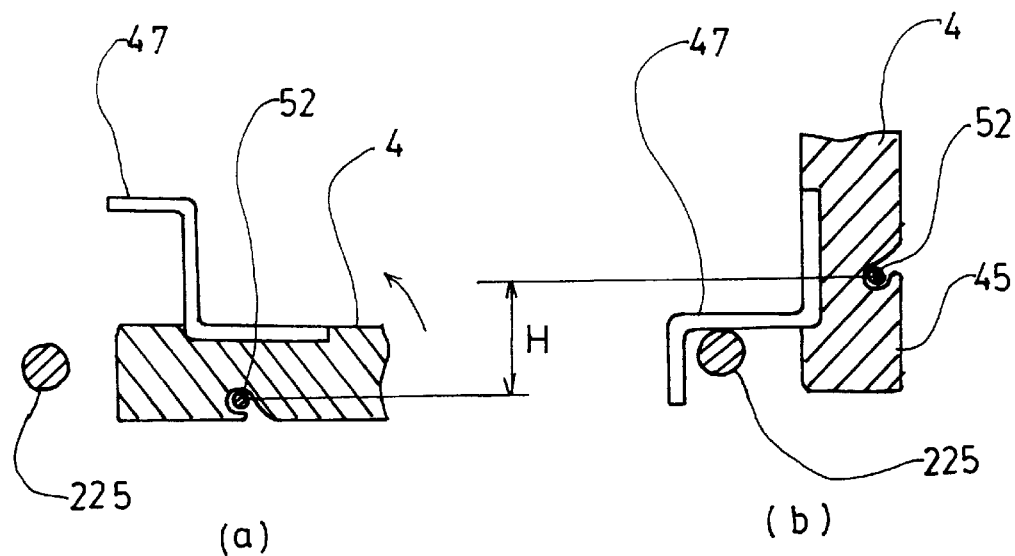
FIG. 9 is a view illustrating a state of contact between a pivotal contact portion of a dolly plate and a free caster support plate in another form.
Figure 10:
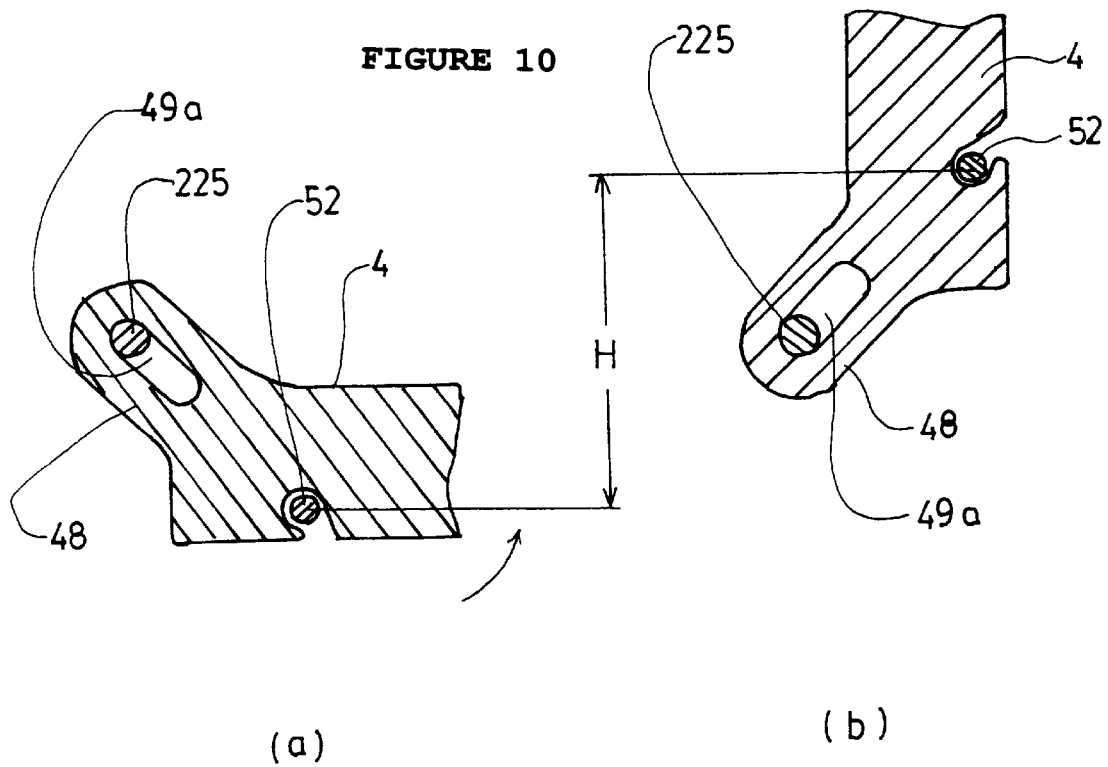
FIG. 10 is an illustration of a state of contact between a pivotal contact portion of a dolly plate and a free caster support plate in still another form.
Figure 11:
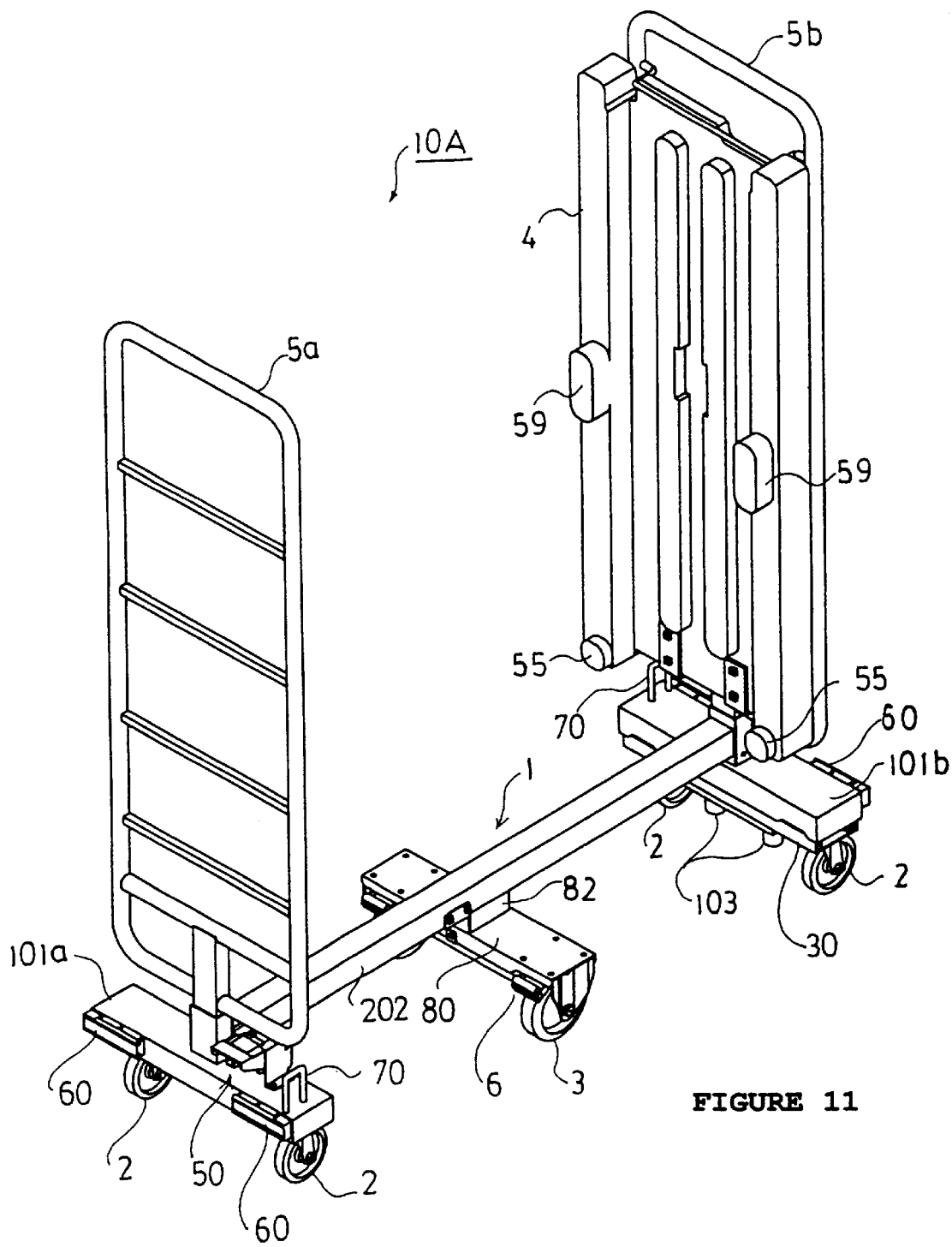
FIG. 11 is a perspective view illustrating a state in which a dolly plate of a stock cart of the invention is stood up.

Furthermore, in the invention, the pivotal contact portion of the dolly plate and the free caster support plate are not particularly limited as long as the pivotal contact portion and the free caster support plate perform an operation of raising the stationary casters and an integral portion of the dolly frame (in a view from the dolly frame, an operation of lowering the free caster portion 2A) at the time of pivoting the dolly plate upward. For example, a method as shown in FIG. 9 based on the contact between a crank-shaped metal plate 47 formed on a dolly plate 4 and a member 225 attached to a free caster support plate, a method as shown in FIG. 10 based on the contact between an elongated hole 49a formed in a protruded portion 48 protruded upward at 45° from an edge of a dolly plate 4 and a member 225 attached to a free caster support plate, or the like maybe cited. In either method, the dolly frame is lifted by an amount corresponding to a length H in a state where the dolly plate 4 is stood up (portion (b) in each drawing) in comparison with a state where the dolly plate 4 is laid down (portion (a) in each drawing).

Next, a second embodiment of the invention will be described with reference to FIG. 11 to FIG. 20. In FIG. 11 to FIG. 18, a stock cart 10A has a caster-equipped dolly frame 1, a pair of side face frames 5a, 5b, and a dolly plate 4.

The dolly frame 1 is formed into a letter-H configuration by a member 101a at a forward end portion and a member 101b at a rearward end portion that are spaced from each other by a predetermined interval and are disposed parallel to each other, and by a connector member 202 that integrally interconnects the two end members 101a, 101b. Free casters 2, 2 are attached to a bottom surface of the member 101a disposed at the forward end portion of the dolly frame 1. A brake operating means 50 and a nesting restricting protrusion 70 are provided on an upper surface of the member 101a. Impact absorber pads 60, 60 are provided on an end surface portion of the member 101a. The member 101b disposed at the rearward end portion of the dolly frame 1 has a bottomless lid shape. The member 101b has, in an upper surface of a middle portion thereof, a through-hole 102 that loosely fits over a support column portion 31 of a caster support 30. The member 101b has, in a lower surface of the lid-like shape thereof, engaging protruded rods 103, 103 that are slidably inserted into guide cylinder-like portions 32, 32 provided on the caster support 30. As in the member 101a of the forward end portion, the member 101b is provided, on its upper surface, with a nesting restricting protrusion 70, and is provided, on its end surface portion, impact absorber pads 60.

Two end portions of the connector member 202 are provided with side face frame holder portions 40, 40 each of which is secured at one end thereof to the member 101a or 101b. The side face frames 5a, 5b can be formed by inserting support columns of the side face frames 5a, 5b into the side face frame holder portions 40, 40. The caster support 30 has a channel-like shape. The free casters 2, 2 are attached to two ends of a lower surface of the caster support 30. The support column portion 31, which is positioned at a middle of the caster support 30 and extends upward therefrom, has in its distal end portion a shaft support portion 311 that pivotably bears or secures a support bar 81. Stationary casters 3, 3 are attached to a bottom surface of a middle portion of the connector member 202 via a stationary caster support plate 7 and a stationary caster height adjuster plate 71.

The dolly plate 4 is formed by two pivotal connector plates 58, 58 pivotably supported to the support bar 81 and shaft-like protrusions 551, 551 attached to the side face frame 5b, a rectangular dolly plate body 41A, and dolly plate height adjuster plates 59. Each pivotal connector plate 58 is formed by a support bar bearing portion 521 located at a distal end of the pivotal connector plate 58, a shaft-like protrusion bearing portion 522, and a dolly plate stopper portion 423. The shaft-like protrusion bearing portion 522 of each pivotal connector plate 58 serves as a fulcrum for the pivoting of the dolly plate 4, and is positioned diagonally downward from the support bar bearing portion 521. Due to this construction, when the dolly plate 4 is stood up, the support bar bearing portions 521 of the pivotal connector plates 58, 58 are forced downward, with the shaft-like protrusion bearing portions 522 serving as a fulcrum, so that the caster support 30 is forced downward relative to the dolly frame 1. The positions of disposal of the shaft-like protrusions 551, 551 and the shaft-like protrusion bearing portions 522 may be contrary to what is described above. That is, the shaft-like protrusions 551, 551 may be secured to the pivotal connector plates 58, 58, and the shaft-like protrusion bearing portions 522 may be secured to the side face frame 5b.

The shape of the side face frame 5b is generally rectangular. A nesting-side vertical member 501 of the side face frame 5b has a receded portion 502 and a receded portion 503 for, at the time of nesting, avoiding overlaps with the dolly plate height adjuster plates 59 of an adjacent stocker cart and thereby avoiding formation of useless spaces. When the stock cart 10A of the embodiment constructed as described above is to be used, the dolly plate 4 pivotable about the shaft-like protrusions 551, 551 secured to lower portions of the side face frame 5b is laid down onto the dolly frame 1 (FIG. 12 to FIG. 14 and FIG. 17). The dolly plate height adjuster plates 59 contact the stationary caster support plate 7, so that the dolly plate 4 assumes a stable state where the dolly plate 4 is parallel to a ground surface. Furthermore, with regard to the rearward end portion of the dolly plate 4, a rearward reverse surface 45 of the dolly plate contacts an upper surface of the member 101b disposed at the rearward end portion.

Figure 12:
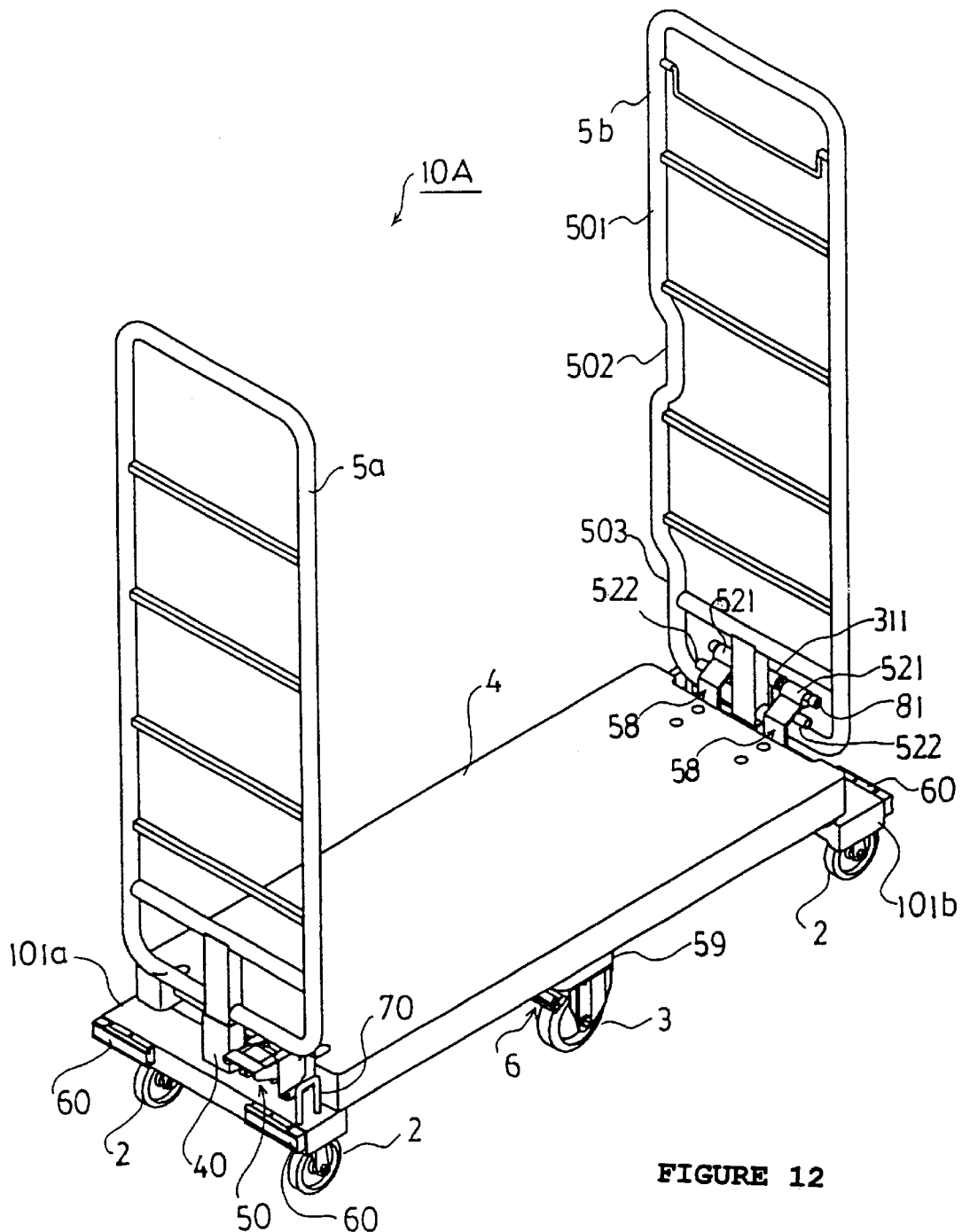
FIG. 12 is a perspective view illustrating a state in which the dolly plate of the stock cart of the invention is laid down.
Figure 13:
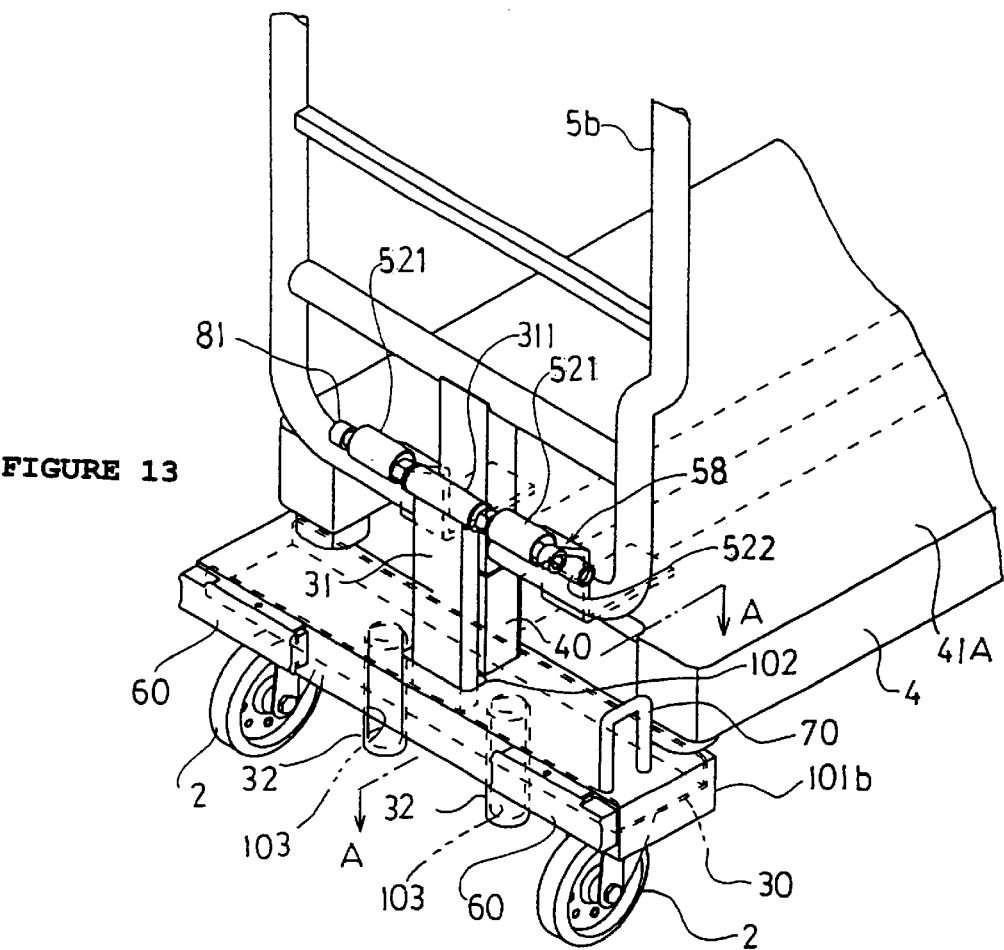
FIG. 13 is an enlarged view of a rearward end portion shown in FIG. 12.
Figure 14:
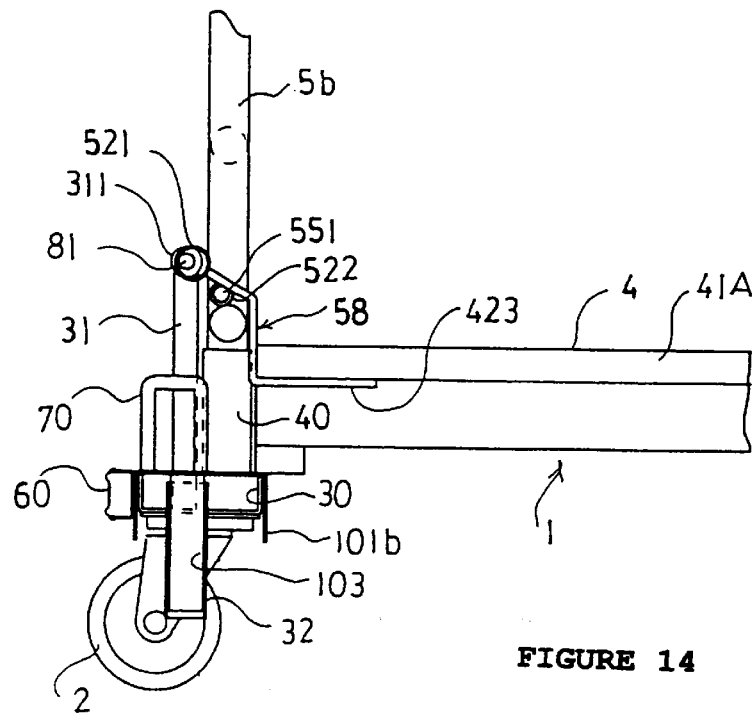
FIG. 14 is a side view thereof, a portion of which shows an A—A section indicated in FIG. 13.
Figure 15:
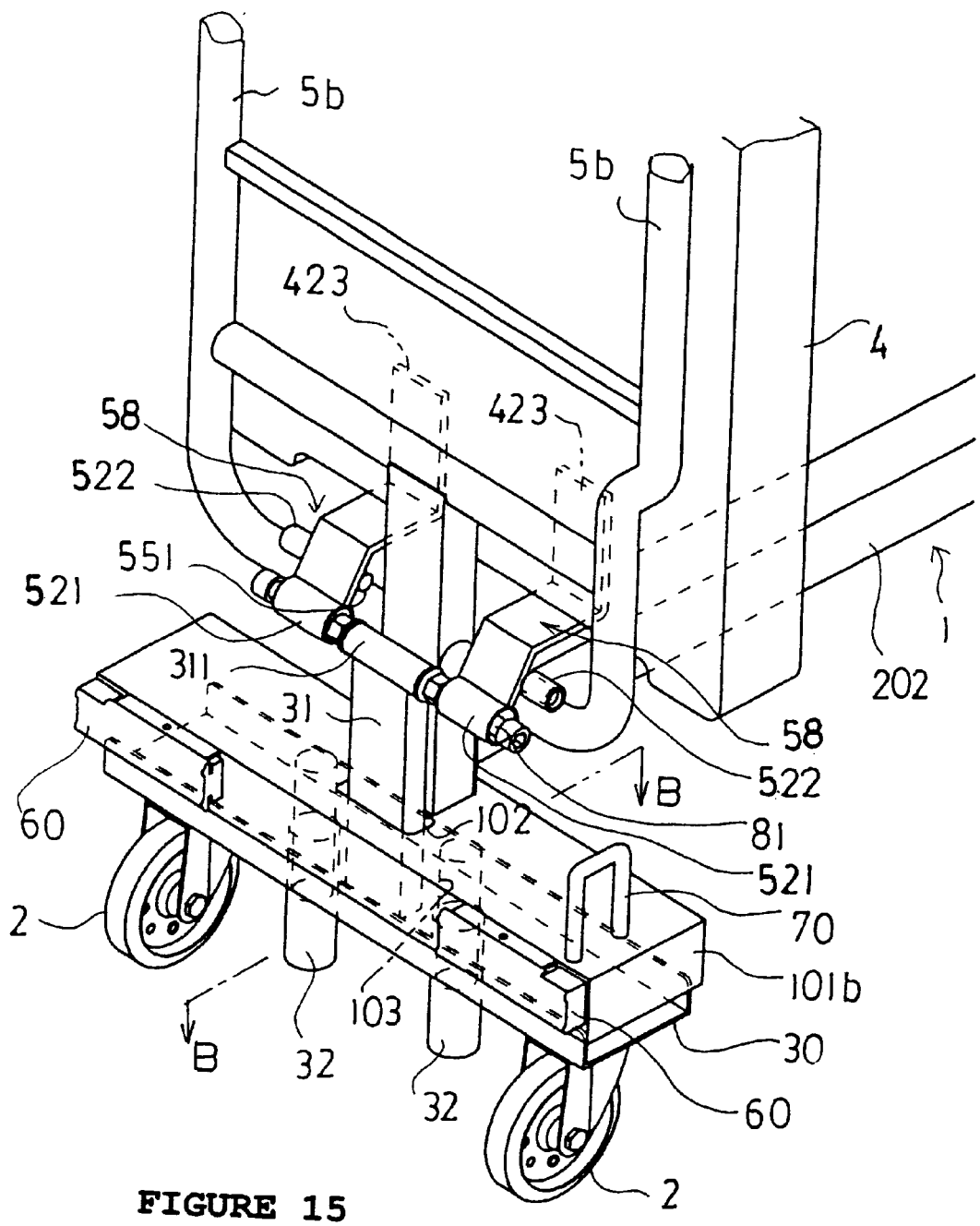
FIG. 15 is an enlarged view of a rearward end portion shown in FIG. 11.
Figure 16:
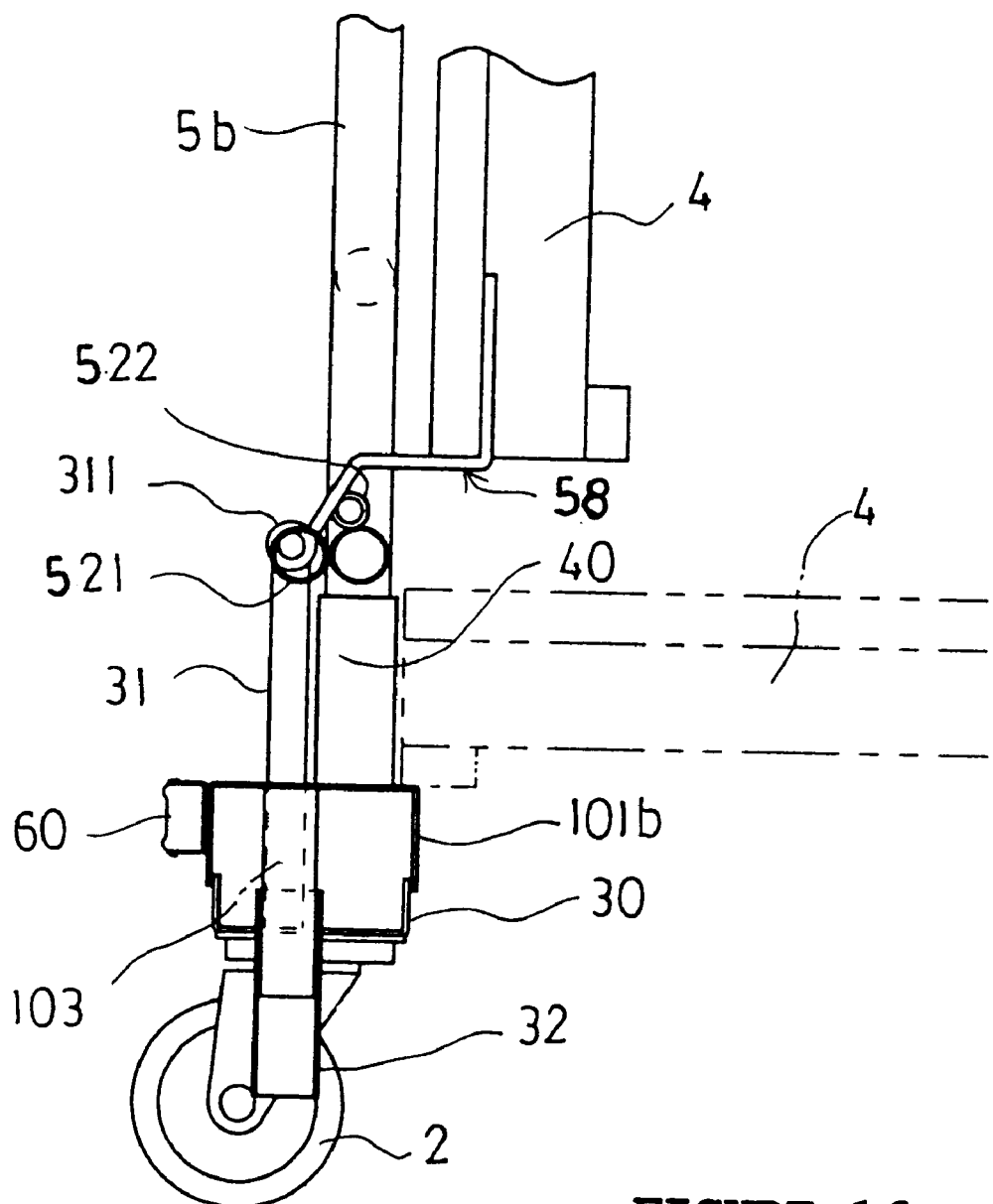
FIG. 16 is a side view thereof, a portion of which shows a B—B section indicated in FIG. 15.
Figure 17:
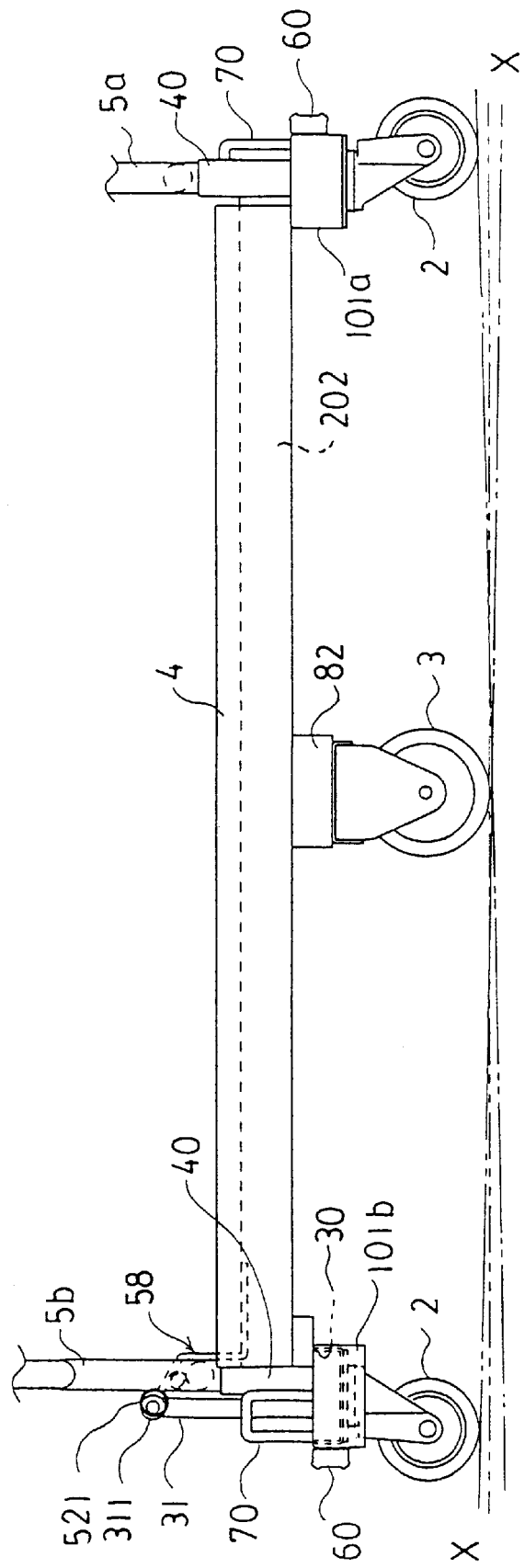
FIG. 17 is a side view of a downward portion shown in FIG. 12, where a portion is omitted.

The thus-formed stock cart 10A is a six-wheel cart as shown in FIG. 12 and FIG. 17. The stock cart 10A can be moved in the fashion of a seesaw with the middle-positioned stationary casters 3, 3 being a center. Furthermore, direction turning movements and the like of the stock cart 10A can be freely accomplished. The dolly plate 4 may be simply placed on the dolly frame 1, or may be fastened thereto by a fastening device. Ground contact planes X—X of the free casters 2 and the stationary casters 3 may be one and the same plane, or the ground contact plane of the stationary casters 3 may be below the ground contact plane of the free casters 2.

Next, when the stock cart 10A is to be nested, the dolly plate 4 is stood up by pivoting the dolly plate 4. The dolly plate 4 is then secured to the side face frame 5b formed rearward by, for example, a chain or a rope, although not shown in the drawings.

Figure 18:
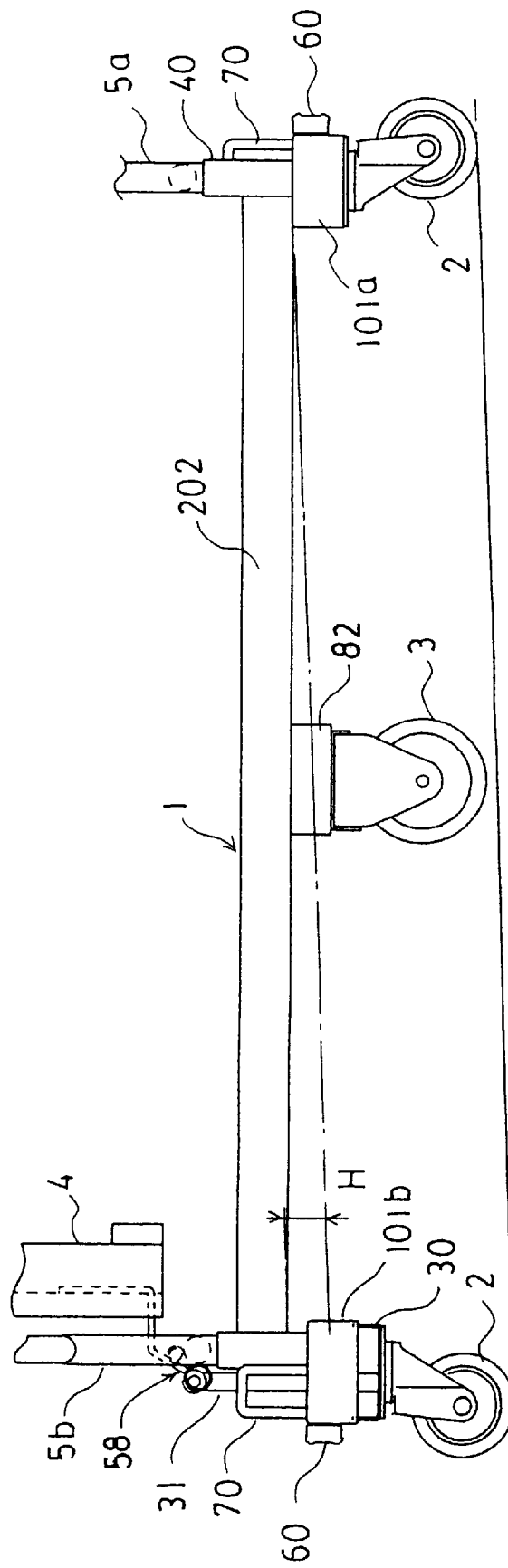
FIG. 18 is a side view of a downward portion shown in FIG. 11, where a portion is omitted.

In the stock cart 10A of this embodiment, each pivotal connector plate 58 connected to the dolly plate 4 has the support bar bearing portion 521 and the shaft-like protrusion bearing portion 522, and the shaft-like protrusion bearing portion 522 is positioned diagonally downward of the support bar bearing portion 521, and serves as the pivot fulcrum of the dolly plate 4, as shown in FIG. 13 to FIG. 18. Therefore, by standing the dolly plate 4 up, the side face frame 5b is lifted upward. That is, the stationary casters 3, the side face frame 5b and the integrally secured members of the dolly frame 1 are lifted by amounts corresponding to a length H from the state assumed during the use, so that a plane defined by lower ends of the stationary casters 3 is positioned above the plane defined by the lower ends of the free casters 2, as shown in FIG. 18. In this case, a frame body formed by the side face frames 5a, 5b and the dolly frame assumes a state where the frame body is slightly inclined rightward (toward the forward end portion). In this nestable-state cart, the stationary casters 3 are idle, and the cart is moved only on the four free casters. Therefore, the cart can be moved in free directions, and can be nested in a direction of a shorter dimension of the cart.

Figure 19:
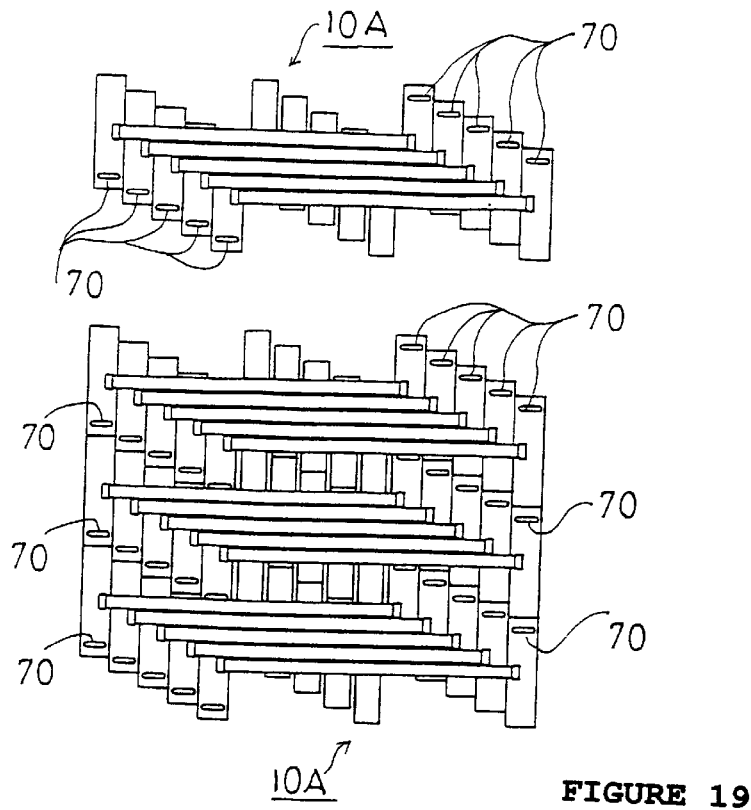
FIG. 19 is a plan view illustrating a nested state in a case where each dolly frame has an H-shaped configuration.
Figure 20:
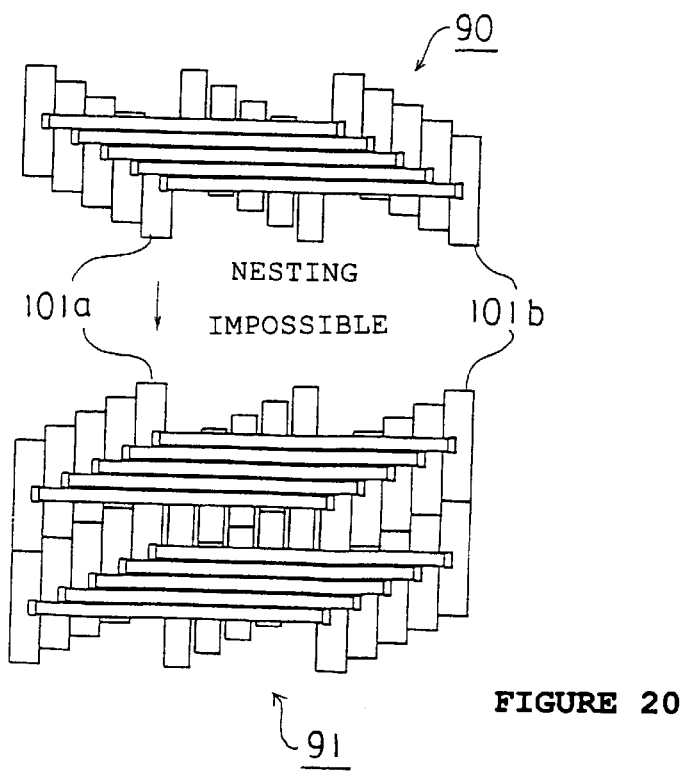
FIG. 20 is a plane view illustrating a state where effective nesting is not possible, FIG. 21 are illustrations of nested states of conventional stock carts.

The nesting will be described with reference to FIG. 19 and FIG. 20. FIG. 19 is a plan view illustrating a nested state in a case where each dolly frame has an H-shaped configuration; and FIG. 20 is a plan view illustrating a state where effective nesting is not possible. In FIG. 19, in the case where each dolly frame has the H-shaped configuration, the nesting restricting protrusion 70 restricts the direction of nesting, and thus indicates a correct direction to an operating person. That is, if the nesting is performed on the nesting restricting protrusion 70-located side, space can be efficiently used without forming a useless space. If the nesting is attempted on the side opposite to the nesting restricting protrusion 70-located side, the nesting restricting protrusion 70 and the connector member 202 of dolly frames impinge on each other, so that effective nesting is not accomplished. In contrast, in the case where a nesting restricting protrusion 70 is not provided as shown in FIG. 20, an operating person becomes confused in determining a nesting direction. For example, if the nesting of a stock cart group 90 and a stock cart group 91 together is attempted, the forward end members 101*a* of dolly frames 1 contact each other and the rearward end members 101*b* contact each other, so that a useless space is formed. If each dolly frame 1 has a Z-shaped configuration or a reversed Z-shaped configuration, the nesting direction is relatively readily determined. Therefore, the nesting restricting protrusion 70 is effective particularly if the dolly frame 1 has an H-shaped configuration.

Furthermore, in the invention, the function or structure of the pivotal portion of the dolly plate is not limited to the above-described fashions but may be provided in various forms, as long as the pivotal portion performs an operation of raising the stationary casters and an integral portion of the dolly frame (in a view from the free casters, a lowering operation) at the time of pivoting the dolly plate upward.

According to the invention, when the stock cart is to be used, the dolly plate is laid down, and loads are placed thereon, and the stock cart is moved. The stock cart can be moved in a seesaw fashion about the stationary casters, and the direction turning and the like of the stock cart can be freely performed. When the stock cart is to be stored, that is, when the stock cart is to be nested, the dolly plate is stood up, so that the stationary casters become idle. That is, the stock cart is movable only on the four free casters, so that the stock cart can be moved in free directions, and can be nested in a direction of a shorter dimension of the stock cart. Furthermore, at the time of nesting, an error in the nesting direction is eliminated, so that the operating efficiency improves and space can be efficiently used without forming a useless space.

What is claimed is:

1. A stock cart comprising:

a dolly frame formed into a generally letter-Z configuration or a generally reversed letter-Z configuration by a support bar that is disposed at a rearward end portion and that has at two ends thereof tubular cylinder portions, a member that is disposed at a forward end portion and is disposed at a predetermined interval apart from the support bar and parallel to the support bar, and a connector member that integrally interconnects an end portion of the member of the forward end portion and an end portion of the support bar of the rearward end portion that are positioned on a diagonal line;

forward end portion-side free casters attached to a bottom surface of the member of the forward end portion of the dolly frame;

a free caster portion including rearward end portion-side free casters, a free caster support plate that secures and interconnects support brackets of the rearward end portion-side free casters, and a pair of piston portions that are secured above the free casters and that are inserted in the tubular cylinder portions so that the piston portions are slidable in upward and downward directions;

a stationary caster attached to a bottom surface of a middle portion of the connector member;

a forward end-side side face frame secured at two ends thereof to an end portion of the member of the forward end portion;

a rearward end-side side face frame two end portions of which are secured to or detachably disposed on outer sides of the cylinder portions; and a dolly plate having a rectangular dolly plate body, and a pivotal contact portion that is pivotably supported by the support bar of the rearward end portion, the stock cart being characterized in that the pivotal contact portion of the dolly plate has a support bar bearing groove, and a plate stopper end portion having a quadrangular section, and a configuration of the dolly plate stopper end portion is formed so that when the dolly plate is placed on the dolly frame, a distance between the support bar and a rearward end surface of the dolly plate is greater than a distance between the support bar and the free caster support plate.

2. A stock cart comprising:

a dolly frame formed into a generally letter-Z configuration or a generally reversed letter-Z configuration by a support bar that is disposed at a rearward end portion and that has at two ends thereof tubular cylinder portions, a member that is disposed at a forward end portion and is disposed at a predetermined interval apart from the support bar and parallel to the support bar, and a connector member that integrally interconnects an end portion of the member of the forward end portion and an end portion of the support bar of the rearward end portion that are positioned on a diagonal line;

forward end portion-side free casters attached to a bottom surface of the member of the forward end portion of the dolly frame;

a free caster portion including rearward end portion-side free casters, a free caster support member that secures and interconnects support brackets of the rearward end portion-side free casters, and a pair of piston portions that are secured above the free casters and that are inserted in the tubular cylinder portions so that the piston portions are slidable in upward and downward directions;

a stationary caster attached to a bottom surface of a middle portion of the connector member;

a forward end-side side face frame secured at two ends thereof to an end portion of the member of the forward end portion;

a rearward end-side side face frame two end portions of which are secured to or detachably disposed on outer sides of the cylinder portions; and a dolly plate having a rectangular dolly plate body, and a pivotal contact portion that is pivotably supported by the support bar of the rearward end portion, the stock cart being characterized in that a support bar bearing groove is formed on a lower surface side of the pivotal contact portion, and a stopper piece is formed on an upper surface of the pivotal contact portion, and the dolly plate is connected to the rearward end-side side face frame so that a plane defined by a lower end of the stationary caster is above a plane defined by lower ends of the four free casters by bringing the stopper piece and the free caster support into contact.

* * * * *